United States Patent [19]

Rivetti et al.

[11] Patent Number: 5,286,816
[45] Date of Patent: Feb. 15, 1994

[54] ORGANIC GLASS WITH IMPROVED IMPACT STRENGTH AND WITH A REFRACTIVE INDEX EQUAL OR SIMILAR TO THAT OF MINERAL GLASS

[75] Inventors: Franco Rivetti, Milan; Fiorenzo Renzi, Gorgonzola; Claudio Gagliardi, San Donato Milanese, all of Italy

[73] Assignee: Enichem Synthesis S.p.A., Palermo, Italy

[21] Appl. No.: 49,600

[22] Filed: Apr. 20, 1993

Related U.S. Application Data

[63] Continuation of Ser. No. 858,013, Mar. 26, 1992, abandoned.

[30] Foreign Application Priority Data

Mar. 28, 1991 [IT] Italy ................... MI 91 A 000859

[51] Int. Cl.$^5$ .................... C08F 4/34; C08F 226/06; C08F 218/12; C08F 216/12
[52] U.S. Cl. ................... 526/230.5; 526/232; 526/232.1; 526/261; 526/314; 526/332
[58] Field of Search ............... 526/230.5, 232, 232.1, 526/261, 314, 332

[56] References Cited

U.S. PATENT DOCUMENTS

| | | | |
|---|---|---|---|
| 4,622,376 | 11/1986 | Misura et al. | 526/286 |
| 4,812,545 | 3/1989 | Renzi et al. | 526/230.5 |

FOREIGN PATENT DOCUMENTS

| | | |
|---|---|---|
| 0201978 | 11/1986 | European Pat. Off. . |
| 0204083 | 12/1986 | European Pat. Off. . |
| 0224123 | 6/1987 | European Pat. Off. . |
| 0227178 | 7/1987 | European Pat. Off. . |
| 0284139 | 9/1988 | European Pat. Off. . |
| 0302537 | 2/1989 | European Pat. Off. . |

*Primary Examiner*—Bernard Lipman
*Assistant Examiner*—Wu C. Cheng
*Attorney, Agent, or Firm*—Oblon, Spivak, McClelland, Maier & Neustadt

[57] ABSTRACT

An organic glass with improved impact strength and with a refractive index equal or similar to that of mineral glass (crown glass), is composed of the product of the radicalic polymerization of the polymerizable liquid composition obtained by the transesterification of:
 (A) diallyl carbonate with a mixture of polyols:
 (B) bis(2-hydroxyethylether) of bisphenol-A,
 (C) diethylene glycol, and
 (D) tris(hydroxyethyl) isocyanurate, where for every 100 parts b.w. of the sum of polyols (B), (C) and (D), polyol (B) is present in a quantity of from 20 to 60% b.w., polyol (C) is present in a quantity of from 20 to 60% b.w. and polyol (D) is present in a quantity of from 10 to 40% b.w.; and where the molar ratio between the diallyl carbonate and the sum of polyols (A)/(B)+(C)+(D) is equal to or higher than 3/1.

6 Claims, No Drawings

ORGANIC GLASS WITH IMPROVED IMPACT STRENGTH AND WITH A REFRACTIVE INDEX EQUAL OR SIMILAR TO THAT OF MINERAL GLASS

This application is a continuation of application Ser. No. 07/858,013, filed on Mar. 26, 1992, now abandoned.

DESCRIPTION

The present invention relates to an organic glass with improved impact strength and with a refractive index equal or similar to that of mineral glass (crown glass).

Organic glass composed of the radicalic polymerization products of poly(allyl carbonates) of polyols and used for optical equipment, is already known in the art and is described, for example, by F. Strain in "Encyclopedia of Chemical Processing and Design", Vol. 1, Interscience Publishers, New York, 1964, pages 799 on.

To enhance one of more of the optical or mechanical characteristics of organic glass, it is common in the art to use polymerizable liquid compositions containing several allyl carbonates and possibly also copolymerizable monomers of different types. In particular, when organic glass having an increased refractive index is required, it is customary to use an allyl carbonate of the aromatic kind, generally combined with an allyl carbonate of the aliphatic kind and with a mixed aliphatic-/aromatic allyl carbonate and/or a different monomer for example of the allylic kind, as described in U.S. Pat. No. 4.602.075 and European Patent Application publication No. 284.139.

At present, there is a demand for an organic glass with a refractive index which is equal or similar to that of mineral glass, and with a good combination of optical and mechanical characteristics, in particular having a high impact strength, and which can be easily obtained and in a practical way.

It has now been found, in accordance with the present invention, that a liquid composition which can be obtained from the transesterification reaction of diallyl carbonate with certain dosages of three different polyols is able to produce, by means of radicalic polymerization, an organic glass with a refractive index which is equal or similar to that of mineral glass, with good optical characteristics and improved impact strength. It is thus possible to satisfy the above demands, avoiding the complications involved in the use of the complex multicomponent polymerizable mixtures of the known art.

In accordance with this, the present invention relates to an organic glass with an improved impact strength and having a refractive index equal or similar to that of mineral glass (crown glass), composed of the radicalic polymerization product of a polymerizable liquid composition, obtained by the transesterification of:

(A) diallyl carbonate:

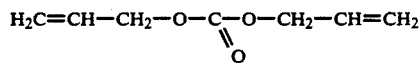

with the mixture of polyols:
(B) bis(2-hydroxyethylether) of bisphenol-A:

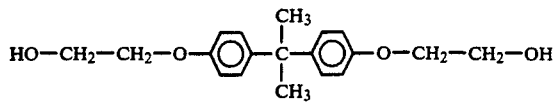

(C) diethylene glycol

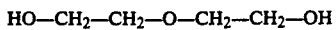

(D) tris(hydroxyethyl) isocyanurate:

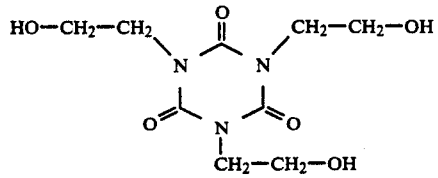

where for every 100 parts by weight of the sum of polyols (B), (C) and (D), polyol (B) is present in a quantity of from 20 to 60% by weight, polyol (C) is present in a quantity of from 20 to 60% by weight and polyol (D) is present in a quantity of from 10 to 40% by weight; and where the molar ratio between the diallyl carbonate and the sum of polyols (A)/[(B)+(C)+(D)] is equal to or higher than 3/1.

In the preferred method, in the transesterification reaction, for every 100 parts by weight of the sum of polyols (B), (C) and (D), polyol (B) is present in a quantity of from 30 to 50% by weight, polyol (C) is present in a quantity of from 30 to 50% by weight and polyol (D) is present in a quantity of from 15 to 30% by weight; and the molar ratio between the diallyl carbonate and the sum of polyols (A)/[(B)+(C)+(D)] varies from 4/1 to 12/1.

In the preparation of the polymerizable liquid composition, the transesterification reaction may be carried out using the procedure generally described in European Patent No.35.304, by mixing the reagents, in the above-mentioned proportions, and reacting them at a temperature ranging from 80° to 160° C., and preferably from 90° to 130° C., in the presence of an alkaline catalyst and continuously eliminating the allylalcohol which is formed as a by-product of the reaction.

The catalysts which are suitable for the purpose are hydroxides, carbonates and alcoholates of alkaline metals, organic bases and ion exchange basic resins. Specific examples of catalysts are sodium hydroxide, sodium carbonate and sodium methylate. The catalyst is best used in quantities of at least 1 ppm (parts per million by weight), with respect to the total weight of polyols and preferably in quantities of 0.01-0.3% by weight with respect to said polyols.

The reaction is most conveniently carried out at a sufficient pressure to maintain the boiling system at the selected operating temperature, to favour the elimination of the allylalcohol from the reaction mixture. For examples pressure values of from 20 to 760 torr. and preferably from 50 to 400 torr. are suitable for the purpose.

Under the above conditions, the reaction times are generally within the range of from 0.5 to 20 hours and usually from 0.5 to 2 hours.

After cooling, the reaction mixture is washed with water to remove the small quantities of catalyst, and when the aqueous phase has been cleared and separated, the unaltered diallyl carbonate is eliminated by distillation, by increasing the temperature to 120° C., under a decreasing pressure with final values of 0.1–20 torr. and preferably 1–3 torr., the required polymerizable composition being obtained as a residue. If necessary, the composition is filtered, after possible treatment with active carbon.

The polymerizable composition thus obtained is liquid at room temperature, with viscosity values of from 50 to 500 cts and a density of 1.15–1.30 g/ml.

The composition is a complex mixture which contains allyl carbonates of polyols (B), (C), and (D), both in monomeric and oligomeric form, as well as allyl carbonates mixed with said polyols, in a ratio between them mainly depending on the predetermined ratios between the reagents fed into the transesterification reaction.

This composition can be transformed into organic glass using the radicalic polymerization procedure by means of casting. For this purpose, one or more polymerization initiators are added to the composition, which are soluble in the composition and able to generate free radicals at temperatures ranging from 30° to 120° C. Preferred examples of these initiators are dicyclohexyl peroxy dicarbonate, diisopropyl peroxy dicarbonate, dibenzoyl peroxide, di-sec-butyl peroxy dicarbonate and ter-butyl perbenzoate. The quantity of initiator can generally vary from 1 to 6 parts by weight for every 100 parts of the composition.

The composition containing the initiator, and possibly also one or more additives selected from those mentioned above, is transformed into the relative organic glass operating at temperatures ranging from 30° to 120° C., with polymerization times varying from 1 to 100 hours.

During the polymerization slight shrinkage takes place and the organic glass thus obtained has higher impact strength values than those of the polymer of bis(allyl carbonate) of diethylene glycol and refractive index values equal or similar to those of mineral glass (crown glass).

The experimental examples which follow provide an illustration of the present invention but do not limit it in any way.

In these examples the polymerizable liquid compositions are prepared by reacting, under transesterification conditions, diallyl carbonate (A) with a mixture of bisphenol-A (B), diethylene glycol (C) and tris(hydroxyethyl) isocyanurate (D) in the above-specified ratios. The polymerization initiator dicyclohexyl peroxy dicarbonate (DCPD) is added to the liquid compositions thus obtained in quantities of 4–5% by weight in the mixture. The compositions containing the catalyst are transformed by polymerization into flat plates having a thickness of 3 mm using the casting technique. With this method the liquid composition, containing the catalyst, is poured into the cavities of a mould composed of two glass elements, with a spacing ring of plasticized polyvinyl chloride or an ethylene-vinyl acetate copolymer (EVA).

The liquid composition is then subjected to polymerization by means of thermal treatment for 20 hours in a forced circulation oven, in accordance with the following temperature profile: 3 hours at 40° C.+7 hours at 40° to 50° C. +9 hours at 50° to 80° C.+1 hour at 80° C. At the end of this treatment, the moulds are opened and the polymerized products are recovered and kept at 100° C. for a further hour to decompose any possible initiator residue and ease any possible internal stress.

The following characteristics are determined on the sheets thus obtained:

a) Optical characteristics

Refractive index [$n_D^{20}$] and Abbe number: measured with an Abbe refractometer (ASTM D-542);

Haze and visible transmittance (%): measured with a Gardner Hazegard XL-211 (ASTM D-1003);

Yellow Index (YI) defined as:

$$YI = (100/Y)\cdot(1.277X - 1.06Z),$$

measured with a Gardner XL-805 colorimeter (ASTM D-1925).

b) Physical and mechanical characteristics.

Density (g/ml): determined with hydrostatic scale at a temperature of 25° C. (ASTM D-792);

Shrinkage (%), calculated with the following formula:

$$\frac{(\text{polymer density} - \text{monomer density})}{(\text{polymer density})} \times 100$$

Rockwell Hardness (M), measured with a Rockwell durometer (ASTM D-785);

Un-notched Izod impact strength (ASTM D-256, modified);

Dyability, expressed as a luminous transmittance % (ASTM D-1003) of the test material after immersion in a dye bath at 98° C. composed of an aqueous dispersion of BPI GREY of the company BRAIN POWER.

EXAMPLE 1

The following products are loaded into a 3-necked lined flask, equipped with a thermometer and magnetic stirrer and connected to a distillation column with 20 perforated plates, heated by means of diathermic oil circulation:

(A) diallyl carbonate [1.979 g (13.938 moles)];
(B) bisphenol-A ethoxylate [bis(2-hydroxyethylether) of bisphenol-A];
(C) diethylene glycol [DEG; 160 g (1.509 moles); and
(D) tris(hydroxyethyl) isocyanurate [THEIC; 80 g (0.306 moles)].

Consequently 40% by weight of component (B), 40% by weight of component (C) and 20% by weight of component (D) are loaded for every 100 parts by weight of the sum of the three components (B), (C) and (D). The molar ratio (A)/[(B)+(C)+(D)] is equal to 6/1.

0.80 ml of a 30% solution by weight of sodium methylate in methanol are also loaded into the flask. The reaction is carried out for 2 hours at a temperature of 95°–119° C. and at a pressure of 150 torr. by distillation of the allyl alcohol as it is formed (total 340 ml; temperature at the column head 59° C.).

At the end of the reaction, the mixture is cooled and washed with three 1,000 ml portions of distilled water. After separating the aqueous layer, the remaining water and excess diallyl carbonate are removed by distillation at 1 torr. at an increasing temperature up to 120° C.

691 g of a liquid product are thus obtained, composed of a mixture of allyl carbonate monomers and oligomers of the polyols used, having the following characteristics:

viscosity (cts, 25° C.): 150, refractive index [n²⁰$_D$]1.4875,
density (g/ml; 20° C.): 1.190
colour (APHA): 5.

EXAMPLE 2

4% by weight of dicyclohexyl peroxy dicarbonate (Composition I) is added to a sample of the transesterification reaction product of Example 1 and 5% by weight of dicyclohexyl peroxy dicarbonate (Composition II) is added to a second sample. Compositions I and II are polymerized as previously specified and the characteristics shown in Table I (Glass I and II) are determined on the polymer thus obtained.

The characteristics of the polymer (Glass III) obtained by polymerizing a composition (composition III) of bis(allyl carbonate) of diethylene glycol, produced by the transesterification of diallyl carbonate and diethylene glycol and using 5% by weight of dicyclohexyl peroxy dicarbonate as catalyst, are shown in the same Table as a comparison.

TABLE 1

| Glass No. | I | II | III |
|---|---|---|---|
| Density (23° C.) | 1.3005 | 1.2980 | 1.3110 |
| Shrinkage (%) | 8.5 | 8.3 | 12.1 |
| [n²⁰$_D$] | 1.5232 | 1.5232 | 1.5000 |
| Abbe Number | 46.5 | 46.5 | 58 |
| YI | 1.80 | 1.60 | 0.90 |
| Haze, % | 0.20 | 0.18 | 0.10 |
| Vis. transmittance (%) | 92.8 | 92.9 | 93.2 |
| Rockwell Hardness (M) | 100 | 97 | 99 |
| Izod (KJ/m²) | 20.5 | 20 | 14 |
| Dyability | 14.8 | 12.6 | 2 |

EXAMPLE 3

Operating under the same conditions as Example 1, the transesterification products are prepared from components (A), (B), (C) and (D) in the proportions indicated in Table 2, samples IV, V and VI. Table 2 also shows the characteristics of these transesterification products.

TABLE 2

| Sample No. | IV | V | VI |
|---|---|---|---|
| (B) % weight | 35 | 30 | 37 |
| (C) % weight | 40 | 45 | 43 |
| (D) % weight | 25 | 25 | 20 |
| (A)/[(B) + (C) + (D)] | 6/1 | 6/1 | 6/1 |
| [n²⁰$_D$] | 1.4865 | 1.4827 | 1.4850 |
| Visc., cts, 25° C. | 165 | 122 | 127 |
| Density, 20° C. | 1.1980 | 1.1963 | 1.1901 |
| APHA colour | 10 | 10 | 5 |

5% by weight of dicyclohexyl peroxy dicarbonate is added to these transesterification products to obtain the polymerizable compositions (compositions IV and VI) which are polymerized as previously specified, and the characteristics are determined on the polymer obtained and are shown in Table 3 (glass IV, V and VI).

TABLE 3

| Glass No. | IV | V | VI |
|---|---|---|---|
| Density (23° C.) | 1.3092 | 1.3124 | 1.3025 |
| Shrinkage (%) | 8.5 | 8.9 | 8.6 |
| [n²⁰$_D$] | 1.5217 | 1.5188 | 1.5216 |
| Abbe Number | 46.5 | 47.5 | 46.6 |
| YI | 1.90 | 2.0 | 1.85 |
| Haze, % | 0.38 | 0.35 | 0.22 |
| Vis. transmittance (%) | 92.2 | 92.3 | 92.5 |
| Rockwell Hardness (M) | 104 | 104 | 101 |

TABLE 3-continued

| Glass No. | IV | V | VI |
|---|---|---|---|
| Izod (KJ/m²) | 15.2 | 17 | 19 |

We claim:

1. Organic glass with an improved impact strength having a refractive index equal or similar to that of mineral glass (crown glass), composed of the product of the radicalic polymerization of a polymerizable liquid composition, obtained by the transesterification of a monomer composition consisting essentially of:

(A) diallyl carbonate:

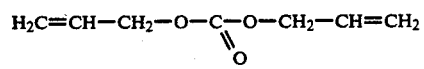

with the mixture of polyols:

(B) bis(2-hydroxyethylether) of bisphenol-A:

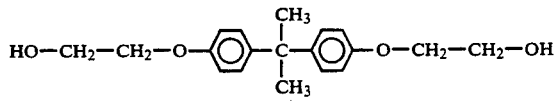

(C) diethylene glycol

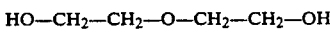

(D) tris(hydroxyethyl) isocyanurate:

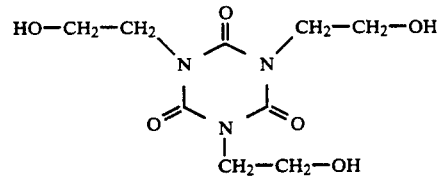

where for every 100 parts by weight of the sum of polyols (B), (C) and (D), polyol (B) is present in a quantity of from 20 to 60% by weight, polyol (C) is present in a quantity of from 2 to 60% by weight and polyol (D) is present in a quantity of from 10 to 40% by weight; and where the molar ratio between the diallyl carbonate and the sum of polyols (A)/[(B)+(C)+(D)] is equal to or higher than 3/1.

2. Organic glass in accordance with claim 1, wherein in the transesterification for every 100 parts by weight of the sum of polyols (B), (C) and (D), polyol (B) is present in a quantity of from 30 to 50% by weight, polyol (C) is present in a quantity of from 30 to 50% by weight and polyol (D) is present in a quantity of from 15 to 30% by weight; and the molar ratio between the diallyl carbonate and the sum of polyols (A)/[(B)+(C)+(D)] varies from 4/1 to 12/1.

3. Organic glass in accordance with claim 1, wherein the transesterification is carried out at a temperature ranging from 80° to 160° C., in the presence of a catalyst selected from the group consisting of hydroxides, carbonates and alcoholates of alkaline metals, organic bases and resins with basic ion exchange, in quantities of at least one ppm (parts per million by weight), with respect to the total weight of the polyols, and continuously eliminating the allyl alcohol formed as a reaction subproduct.

4. Organic glass in accordance with claim 1, wherein the transesterification product is polymerized by casting in the presence of one or more polymerization initiators, soluble in the composition and capable of generating free radicals at temperatures ranging from 30° to 120° C., selected from the group consisting of dicyclohexyl peroxy dicarbonate, diisopropyl peroxy dicarbonate, dibenzoyl peroxide, di-sec-butyl peroxy dicarbonate and ter-butyl perbenzoate, in quantities of from 1 to 6 parts by weight for every 100 parts of the composition.

5. Organic glass in accordance with claim 3, wherein the transesterification is carried out at a temperature ranging from 90° to 130° C.

6. Organic glass in accordance with claim 3, wherein the quantity of said catalyst is in the range 0.01–0.3% by weight with respect to said polyols.

* * * * *